United States Patent [19]
Meyer

[11] Patent Number: 5,907,891
[45] Date of Patent: Jun. 1, 1999

[54] TREE FASTENER WITH SPLIT WINGS

[75] Inventor: Charles Meyer, New Lenox, Ill.

[73] Assignee: Illinois Tool Works Inc., Glenview, Ill.

[21] Appl. No.: 09/028,889

[22] Filed: Feb. 24, 1998

[51] Int. Cl.⁶ .............................. F16B 19/00; A44B 17/00
[52] U.S. Cl. ........................... 24/453; 411/510; 411/913; 24/297
[58] Field of Search .............................. 24/289, 293, 297, 24/453, 458, 531, 114.6; 411/508–510, 913, 908

[56] References Cited

U.S. PATENT DOCUMENTS

| | | | |
|---|---|---|---|
| 2,909,957 | 10/1959 | Rapata | 24/453 X |
| 4,392,278 | 7/1983 | Mugglestone . | |
| 4,402,641 | 9/1983 | Arff . | |
| 4,427,328 | 1/1984 | Kojima | 24/625 X |
| 4,551,189 | 11/1985 | Peterson | 24/114.6 X |
| 4,728,238 | 3/1988 | Chisholm et al. . | |
| 4,776,739 | 10/1988 | Hamman | 24/297 X |
| 4,902,182 | 2/1990 | Lewis | 411/510 |
| 4,938,645 | 7/1990 | Wollar | 411/508 |
| 5,039,267 | 8/1991 | Wollar . | |
| 5,306,098 | 4/1994 | Lewis | 411/510 |
| 5,393,185 | 2/1995 | Duffy, Jr. | 411/510 |
| 5,468,108 | 11/1995 | Sullivan et al. . | |
| 5,718,025 | 2/1998 | Courtin | 24/453 |

*Primary Examiner*—Anthony Knight
*Assistant Examiner*—Robert J. Sandy
*Attorney, Agent, or Firm*—Kane,Dalsimer,Sullivan, Kurucz, Levy, Eisele and Richard, LLP

[57] ABSTRACT

The tree fastener includes a shank, a head and wings on first and second opposed sides of the shank. The wings are split along the tool parting line into wing portions which extend from the shank at different angles so that the spacing between wing portions is one half the distance between successive wings. Additionally, the wing portions are diagonally paired so that wing portions on a first opposed side of the shank and a first side of the tool parting line extend from the shank at the same angle as wing portions on a second opposed side of the shank and a second side of the tool parting line. Likewise, wing portions on a second side of the shank and a first side of the tool parting line extend from the shank at the same angle as wing portions on a first side of the shank and a second side of the tool parting line.

11 Claims, 3 Drawing Sheets

TREE FASTENER WITH SPLIT WINGS

BACKGROUND OF THE INVENTION

1. Field of the Invention

The invention pertains to a tree fastener with wings which are split along the tool parting line and offset half of the branch spacing distance.

2. Description of the Prior Art

Tree fasteners with radially extending branches or wings for insertion into apertures in sheet metal and similar structures are known in the prior art. However, prior art tree fastener designs have a minimum branch spacing dictated by tooling constraints. The branch spacing governs the amount of play when the fastener is installed. If the panel thickness is such that one set of branches is unable to clear the panel, then the tree fastener is retained by the next lower set of branches. This creates play and rattles which are unacceptable in motor vehicles and similar applications. Ideally, the branches would always be located to clear the panels precisely, but thickness variations, burrs and manufacturing tolerances prevent the ideal situation. Some prior art designs rely on flexible arms to compensate for this play and these intolerances, but many times design constraints prevent the use of flexible arms.

Examples of prior art tree fasteners are disclosed in U.S. Pat. No. 5,468,108 entitled "Spiral Flex Tree Fastener" issued on Nov. 21, 1995 to Sullivan et al.; U.S. Pat. No. 5,039,267 entitled "Tee Tree Fastener" issued on Aug. 13, 1991 to Wollar; U.S. Pat. No. 4,776,739 entitled "Plastic Drive Fastener" issued on Oct. 11, 1988 to Hamman; U.S. Pat. No. 4,728,238 entitled "Plastic Drive Fastener" issued on Mar. 1, 1988 to Chisholm et al.; U.S. Pat. No. 4,402,641 entitled "Self Centering Fastener" issued on Sep. 6, 1983 to Arff; and U.S. Pat. No. 4,392,278 entitled "Fastener" issued on Jul. 12, 1983 to Mugglestone.

OBJECTS AND SUMMARY OF THE INVENTION

It is therefore an object of this invention to provide a tree fastener with an increased accuracy of fit.

It is therefore a further object of this invention to provide a tree fastener which decreases the amount of play when installed.

It is therefore a still further object of this invention to provide a tree fastener with a decreased branch spacing and a subsequent finer increment of fit.

It is therefore a still further object of this invention to provide a tree fastener which achieves the above objects while maintaining its strength.

It is therefore a final object of this invention to provide a tree fastener which achieves the above objects without substantial changes in the tooling constraints of present designs.

These and other objects are attained by providing a tree fastener design wherein the branches are split at the tool parting line and are offset by one half of the branch spacing distance. This creates a finer increment, eliminating the need for an overdrive feature. Tool integrity is maintained because this design does not result in "thin steel" conditions. The offset or staggered split branches result in a finer increment thereby minimizing play, without sacrificing the removal strength. Additionally, pairing the split branches diagonally prevents the tree fastener from "walking" out of the aperture under repeated loading or vibration.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
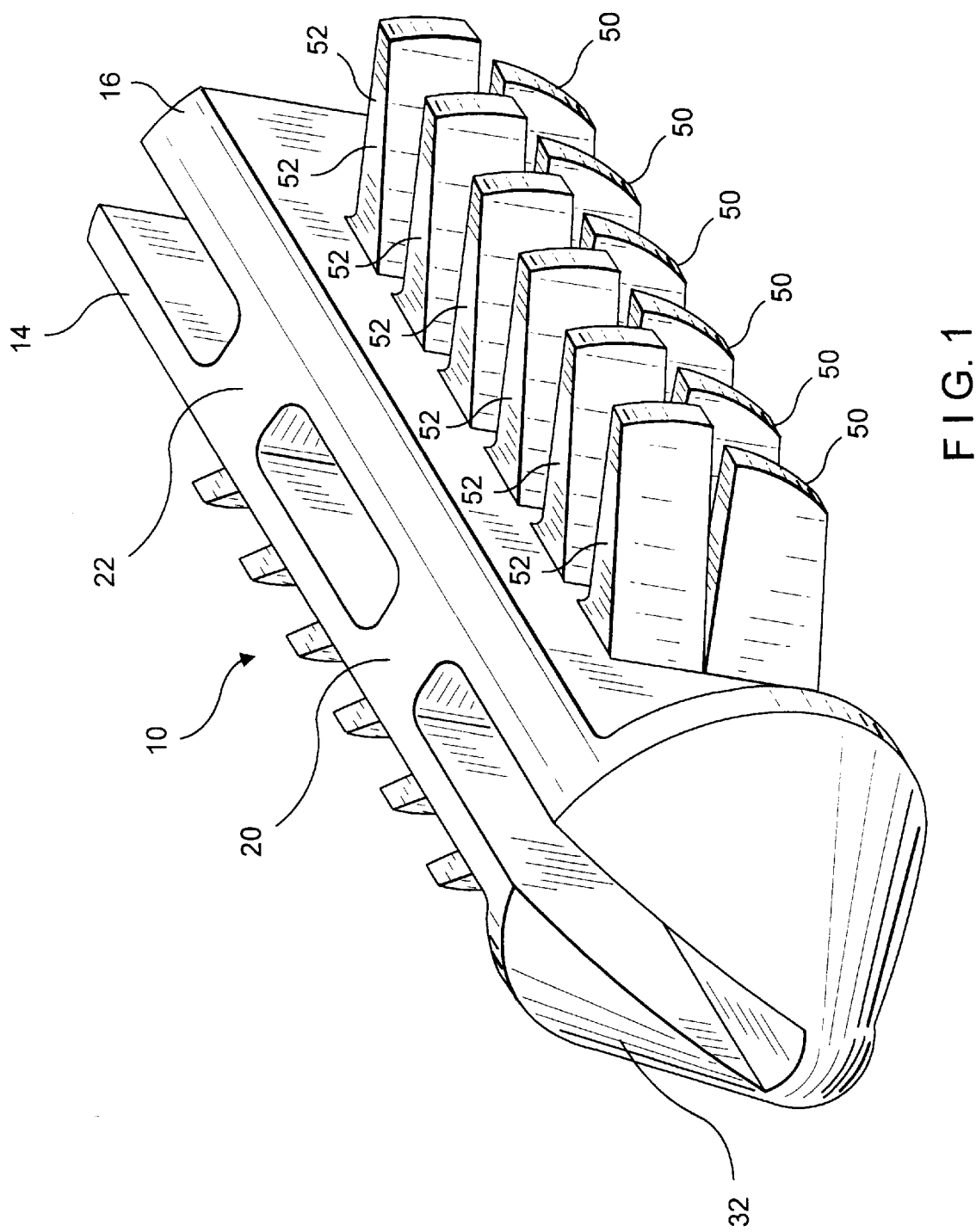
FIG. 1 is a perspective view of the tree fastener of the present invention.

Referring now to the drawings in detail wherein like numerals refer to like elements throughout the several views, one sees that FIG. 1 is a perspective view of tree fastener 10 of the present invention. Tree fastener 10 is formed of molded plastic or a similar material. As shown in FIGS. 1–4, tree fastener 10 includes a longitudinal shank 12 of generally H-shaped cross section. The H-shaped cross section is formed of opposed lateral sides 14, 16 and longitudinal cross member 18. Additionally, opposed lateral sides 14, 16 are spaced by transverse supports 20, 22. The outer ends 24, 26 and 28, 30 of opposed lateral sides 14, 16, respectively, are coextensive with a portion of the circumference of the circular base 31 of conical head 32.

Figure 4:
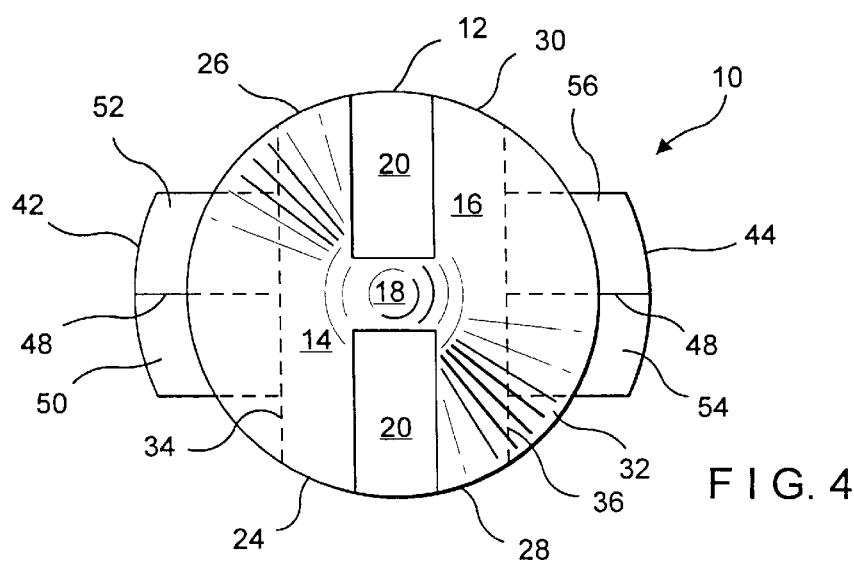
FIG. 4 is a front plan view, partially in phantom, of the tree fastener of the present invention.

As shown in FIGS. 1 and 4, the planar exterior walls 34, 36 of opposed lateral sides 14, 16, respectively, are inwardly recessed from the circular base 31 of conical head 32 thereby forming detent ledges 38, 40, respectively, on the underside of circular base 31 where circular base 31 joins longitudinal shank 12. Additionally, wings or branches 42, 44 are formed on planar exterior walls 34, 36 of opposed lateral sides 14, 16 and extend away from planar walls 34, 36 at an inclined angle extending generally outward and to the rear 46 of longitudinal shank 12.

Wings 42 are split along the tool parting line 48 so that wings 42 form wing halves 50, 52. Similarly, wings 44 are split along the tool parting line 48 so that wings 44 form wing halves 54, 56. The tool parting line 48 is formed on the plane where the two halves of the mold (not shown) meet and extends radially outward from the longitudinal axis of shank 12.

The angle of inclination of wing halves 50, 56 from shank 12 is varied from the angle of inclination of wing halves 52, 54 from shank 12 so that the spacing 58 (see FIG. 2) of each wing half 50 to each successive wing half 52 (or each wing half 54 to each successive wing half 56) is equal to one half of the spacing 60 between wings 42. Spacing 60 is likewise the spacing between successive wing halves of like indicia 50, 52, 54 or 56. This staggered configuration of wing halves 50, 52, 54, 56 allows tree fastener 10 to be manufactured with tooling for the larger increment commensurate with spacing 60 but results in a tree fastener 10 with an effective increment commensurate with the finer spacing 58.

Figure 2:
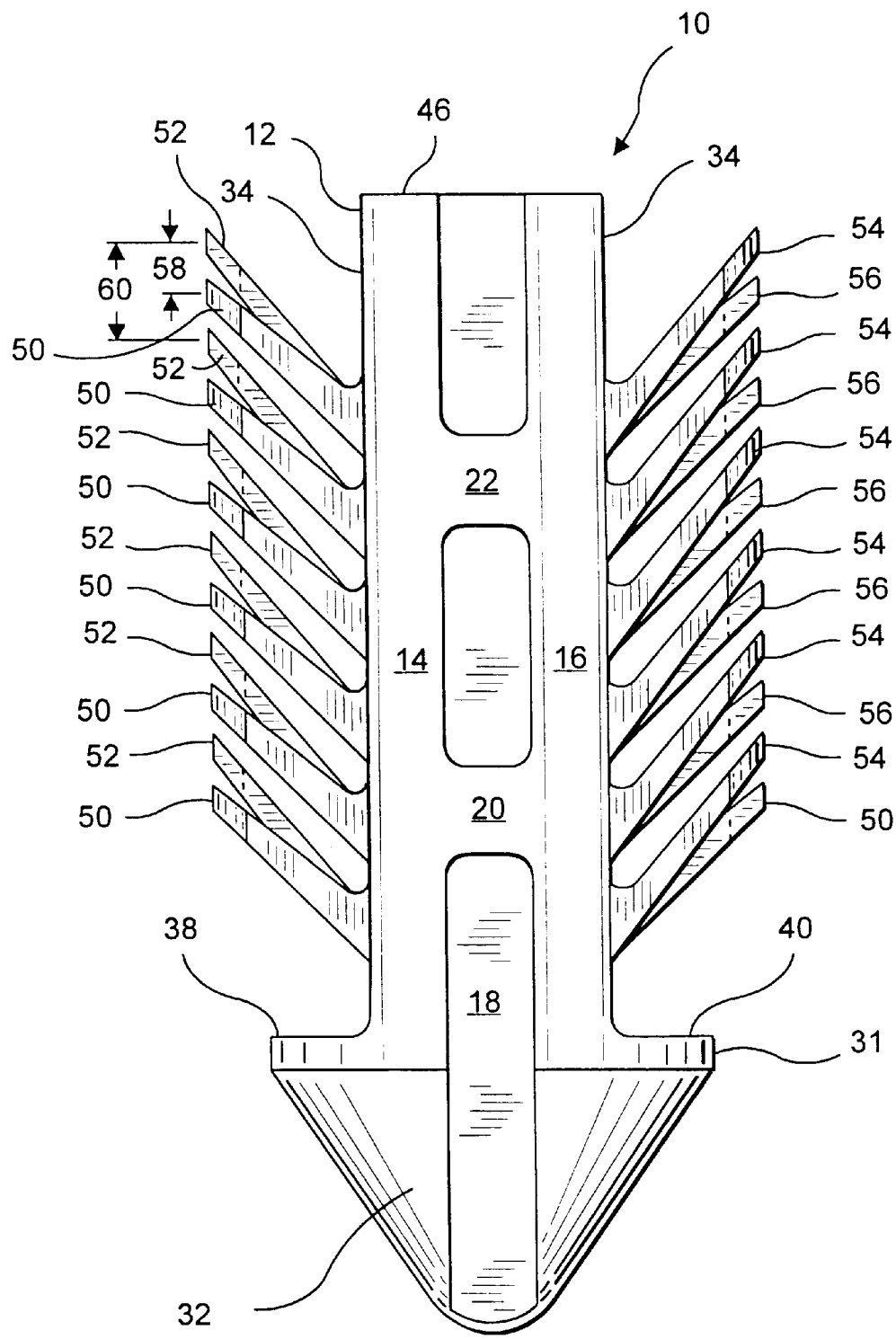
FIG. 2 is a side plan view of the tree fastener of the present invention, further showing a side view of the split wings or branches of the tree fastener.
Figure 3:
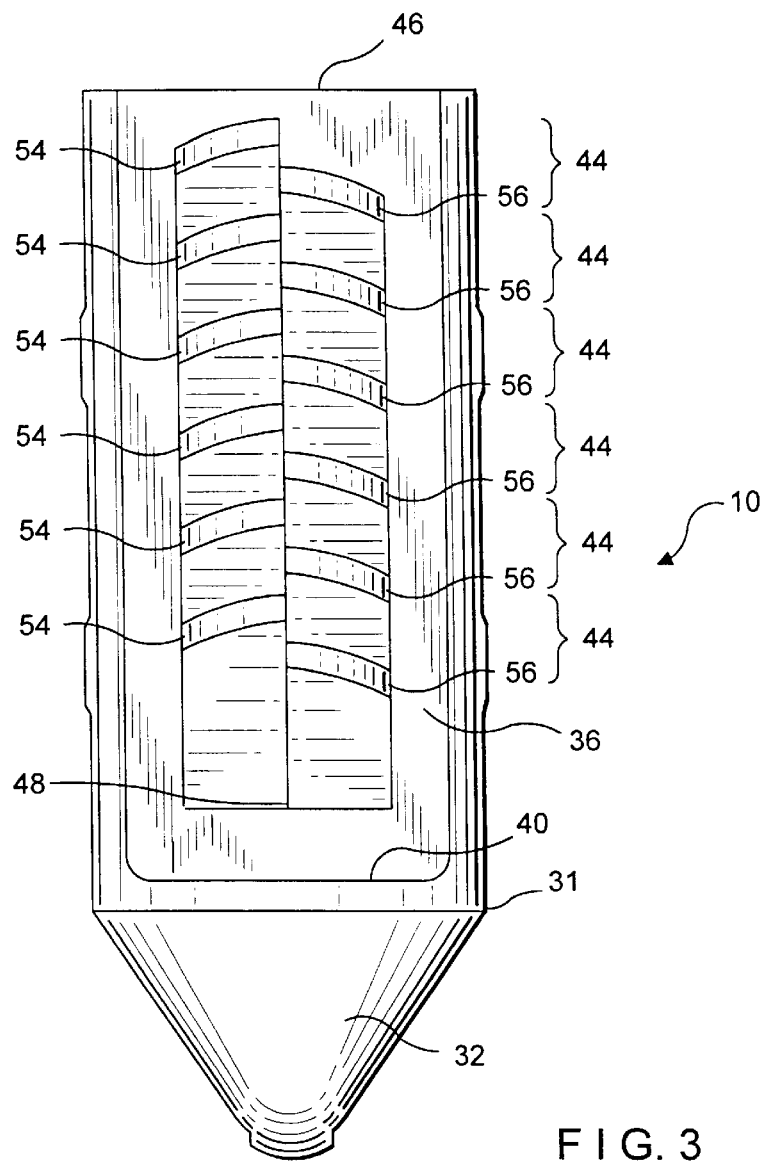
FIG. 3 is a side plan view of the tree fastener of the present invention, further showing an end view of the split wings or branches of the tree fastener.

As illustrated in FIGS. 2, 3 and 4, each pair of wing halves 50, 52 corresponds to a wing 42 and, likewise, each pair of wing halves 54, 56 corresponds to a wing 44. Each wing 42 is directly opposite from wing 44 across shank 12. For each pair of opposed wings 42, 44, wing halves 52 and 54 are inclined a more rearward angle than are wing halves 50 and 56. As illustrated in FIG. 3, this results in the matching of angles of inclination of diagonally opposite wing halves 52, 54 and 50, 56. This matching of inclination of diagonally opposite wing halves minimizes the occurrence of the tree fastener 10 "walking" out of an aperture under repeated loading or vibration.

In other words, the wing halves 50, 52, 54, 56 are diagonally paired so that wing halves 50 on first planar wall 34 of shank 12 and a first side (i.e., the lower side from the perspective of FIG. 4) of the tool parting line 48 extend from shank 12 at the same angle as wing halves 56 on second planar wall 36 of the shank 12 and a second side (i.e., the upper side from the perspective of FIG. 4) of the tool parting line 48. Likewise, wing halves 54 on second planar wall 36 of shank 12 and a first side of the tool parting line 48 extend from shank 12 at the same angle as wing halves 52 on a first planar wall 34 of shank 12 and a second side of the tool parting line.

To use tree fastener 10, the conical head 32 of tree fastener 10 is inserted into an aperture (not shown) which is typically formed in a plurality of successive planar layers of sheet metal to be joined. The wing halves 50, 52, 54, 56 engage the sheet metal. The fine spacing of the wing halves provides for a finer increment and more precise joining of the successive layers.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A tree fastener comprising:
   a shank, having first and second opposed flat surfaces on diametrically opposite sides of said shank;
   a head formed on a first end of said shank;
   a first set of wings, spaced at a predetermined longitudinal distance extending from said first flat surface and an identical set of wings extending from said second flat surface, said wings each being split into a first wing portion and a second wing portion, said first wing portion and said second wing portion extending from said shank at different angles.

2. The tree fastener of claim 1 wherein said different angles are first and second angles whereby a distance between said first wing portion and successive second wing portion is substantially equal to one half of said predetermined longitudinal distance.

3. The tree fastener of claim 2 wherein said wings are split along a plane extending radially from a longitudinal axis of said shank.

4. The tree fastener of claim 3 wherein said plane is formed by a tool parting line.

5. The tree fastener of claim 4 wherein said first wing portions are on a first side of said plane and said second wing portions are on a second side of said plane.

6. A tree fastener comprising:
   a shank, first and second opposed sides of said shank;
   a head formed on a first end of said shank;
   wings, spaced at a predetermined longitudinal distance extending from said first and second opposed sides of said shank, said wings being split into a first wing portion and a second wing portion, said first wing portion and said second wing portion extending from said shank at first and second angles, whereby a distance between said first wing portion and successive second wing portion is substantially equal to one half of said predetermined longitudinal distance;
   wherein said wings are split along a plane extending radially from a longitudinal axis of said shank and said first wing portions are on a first side of said plane and said second wing portions are on a second side of said plane, and
   wherein said first wing portions on said first opposed side of said shank and said second wing portions on said second opposed side of said shank extend from said shank at said first angle and wherein said second wing portions on said first opposed side of said shank and said first wing portions on said second opposed side of said shank extend from said shank at said second angle.

7. The tree fastener of claim 6 wherein said head is substantially conically shaped with a circular base, said circular base having a periphery.

8. The tree fastener of claim 7 wherein said first and second opposed sides of said shank are indented from a periphery of said circular base.

9. The tree fastener of claim 8 wherein said first and second opposed sides of said shank include peripheral portions which are at least partially coextensive with said periphery of said circular base.

10. The tree fastener of claim 9 wherein said shank has a generally H-shaped cross section formed by said first and second opposed sides and a cross member therebetween.

11. The tree fastener of claim 10 wherein the tree fastener is formed of molded plastic.

* * * * *